(12) United States Patent
Aoki et al.

(10) Patent No.: US 9,860,330 B2
(45) Date of Patent: Jan. 2, 2018

(54) CONTROL METHOD FOR COMMUNICATION TERMINAL CONNECTABLE TO WEARABLE TERMINAL VIA NETWORK

(71) Applicant: Panasonic Intellectual Property Corporation of America, Torrance, CA (US)

(72) Inventors: Hideshi Aoki, Osaka (JP); Tetsuji Fuchikami, Osaka (JP); Kazuki Funase, Osaka (JP); Akinori Ozeki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/209,857

(22) Filed: Jul. 14, 2016

(65) Prior Publication Data

US 2017/0069179 A1 Mar. 9, 2017

(30) Foreign Application Priority Data

Sep. 4, 2015 (JP) .................................. 2015-174698

(51) Int. Cl.
*A61B 5/04* (2006.01)
*A61B 5/11* (2006.01)
(Continued)

(52) U.S. Cl.
CPC .......... *H04L 67/26* (2013.01); *G06F 3/04883* (2013.01); *H04B 1/385* (2013.01); *H04M 1/7253* (2013.01)

(58) Field of Classification Search
CPC ........ G08B 21/18; G08B 23/00; G08B 5/228; H04W 68/00; H04W 68/02; H04M 1/72522
USPC ...... 340/539.11, 539.14, 539.15, 573.1, 463; 455/412.2; 600/301, 476, 479, 483, 500, 600/508
See application file for complete search history.

(56) References Cited

U.S. PATENT DOCUMENTS 9,145,067 B1 * 9/2015 Dahlen .................... B60L 15/10
9,443,413 B2 * 9/2016 Faaborg ................. G08B 21/18
(Continued)

FOREIGN PATENT DOCUMENTS

JP 2008-252116 10/2008
JP 2011-523840 8/2011
(Continued)

*Primary Examiner* — George Bugg
*Assistant Examiner* — Munear Akki
(74) *Attorney, Agent, or Firm* — Greenblum & Bernstein, P.L.C.

(57) ABSTRACT

In a method causing a processor in a communication terminal to execute operations that include; detecting whether the communication terminal, which is connected via a network to a wearable terminal that is attached to part of a body of a user, is being manipulated; if the communication terminal is detected as not being manipulated, transmitting notification information that includes push notification to a wearable terminal; if the communication terminal is detected as being manipulated, transmitting the notification information to the communication terminal, without transmitting the notification information to the wearable terminal.

20 Claims, 8 Drawing Sheets

(51) Int. Cl.
*H04L 29/08* (2006.01)
*H04B 1/3827* (2015.01)
*G06F 3/0488* (2013.01)
*H04M 1/725* (2006.01)

(56) References Cited

U.S. PATENT DOCUMENTS

| | | |
|---|---|---|
| 2003/0209735 A1 | 11/2003 | Momose et al. |
| 2013/0162427 A1* | 6/2013 | Dibenedetto ...... A63B 24/0062 340/539.12 |
| 2015/0065095 A1* | 3/2015 | Seo ..................... H04L 67/2823 455/412.2 |
| 2015/0262458 A1* | 9/2015 | Faaborg ................. G08B 5/228 340/539.11 |
| 2015/0341869 A1* | 11/2015 | Sen ....................... H04W 52/34 455/522 |
| 2015/0341904 A1* | 11/2015 | Ryu ..................... H04M 1/725 455/458 |
| 2016/0063850 A1* | 3/2016 | Yang ..................... G08B 23/00 340/539.22 |

FOREIGN PATENT DOCUMENTS

| | | |
|---|---|---|
| JP | 2015-041829 | 3/2015 |
| WO | 2009/151807 | 12/2009 |

* cited by examiner

| APPLICATION | PUSH NOTIFICATION | NOTIFICATION SETTING |
|---|---|---|
| APPLI A | MESSAGE | ON |
| | FRIEND REQUEST | ON |
| | NOTICE | OFF |
| APPLI B | ALARM | OFF |
| | REMINDER | ON |
| | UPDATE INFORMATION | ON |
| | NOTICE | OFF |
| ... | | ... |

FIG. 7

CONTROL METHOD FOR COMMUNICATION TERMINAL CONNECTABLE TO WEARABLE TERMINAL VIA NETWORK

BACKGROUND

1. Technical Field

The present disclosure relates to a control method, a communication terminal, a communication system, and a non-transitory recording medium.

2. Description of the Related Art

There is a known wearable terminal that is attachable to part of the body of a user such as the user's arm or head. This type of wearable terminal has a communication function, so it can communicate with a communication terminal such as a smartphone.

Japanese Unexamined Patent Application Publication No. 2015-41829, for example, discloses a technology by which a user can use a wearable terminal attached to the user to transmit and receive a message through an information processing apparatus that the user possesses.

According to Japanese Unexamined Patent Application Publication No. 2015-41829, if an event of which the user is notified by a smartphone or another communication terminal, such as, for example, a reception of a message or a notification of an application, occurs, a wearable terminal paired with the communication terminal is also notified of the event. Therefore, the user can simply know the contents of the event by checking the notification from the wearable terminal, without having to check the information processing apparatus each time an event occurs.

SUMMARY

Since a wearable terminal is used by being attached to part of the body of the user such as the user's arm or head, however, when a notification by a sound or vibration is transmitted to the wearable terminal, the user may react hypersensitive to the notification. That is, the technology disclosed in Japanese Unexamined Patent Application Publication No. 2015-41829 is problematic in that since a notification by a sound or vibration is transmitted to the wearable terminal, the activity of the user is impaired.

Under the present circumstances, the inability of mounting a battery with a sufficient capacity is a tradeoff for making the wearable terminal compact and lightweight. Therefore, the notification that impairs the activity of the user is not necessary and further has the problem that the battery is consumed unnecessarily.

One non-limiting and exemplary embodiment provides a communication terminal controlling method, a communication terminal, a communication system, and a non-transitory recording medium that can suppress the activity of the user from being impaired and can also suppress a battery in a wearable terminal from being consumed.

In one general aspect, the techniques disclosed here feature a communication terminal controlling method by which a processor in a communication terminal that can be connected to a wearable terminal via a network is caused to control the communication terminal, the wearable terminal being attachable to part of the body of a user. The processor stores, in a memory in the communication terminal, a push notification in an application installed in the communication terminal; the processor detects whether the communication terminal is being manipulated; if it has been detected that the communication terminal is not being manipulated, the processor makes a control so that notification information that includes information indicating the push notification is transmitted to the wearable terminal; if it has been detected that the communication terminal is being manipulated, the processor makes a control so that a notifier in the communication terminal is notified of the information indicating the push notification without transmitting the notification information to the wearable terminal.

According to this disclosure, a communication terminal controlling method and the like can be achieved that can suppress the activity of the user from being impaired and can also suppress a battery in a wearable terminal from being consumed.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

In a control method, in one aspect of the present disclosure, by which a processor in a communication terminal that can be connected to a wearable terminal via a network is caused to control the communication terminal, the wearable terminal being attachable to part of the body of a user: the processor stores, in a memory in the communication terminal, a push notification in an application installed in the communication terminal; the processor detects whether the communication terminal is being manipulated; if it has been detected that the communication terminal is not being manipulated, the processor makes a control so that notification information that includes information indicating the push notification is transmitted to the wearable terminal; if it has been detected that the communication terminal is being manipulated, the processor makes a control so that a notifier in the communication terminal is notified of the information indicating the push notification without transmitting the notification information to the wearable terminal.

Accordingly, while the user is operating the communication terminal, the user can check a push notification on the communication terminal, so it possible to prevent a further push notification from being indicated to the wearable terminal while the user is operating the communication terminal. This can suppress the activity of the user with the wearable terminal attached from being impaired and can also suppress a battery in the wearable terminal from being consumed.

For example, the communication terminal may have a display. When the processor is caused to detect whether the communication terminal is being manipulated, if information is displayed on the display, the processor may detect that the communication terminal is being manipulated; if information is not displayed on the display, the processor may detect that the communication terminal is not being manipulated.

For example, the communication terminal may further have an input acceptor that accepts a manipulation input performed by the user. When the processor is caused to detect whether the communication terminal is being manipulated, if the input acceptor is accepting a manipulation input, the processor may detect that the communication terminal is being manipulated. If the input acceptor is not accepting a manipulation input, the processor may detect that the communication terminal is not being manipulated.

For example, assuming that, if the push notification is neither selected nor viewed on the communication terminal, it has been detected that the communication terminal is not being manipulated, a control may be made in the above control so that the information indicating the push notification is transmitted to the wearable terminal.

For example, the communication terminal may further be connectable to an external server via a network. The communication terminal may receive the push notification in the application from the server and may store the push notification in the memory.

For example, the push notification in the application may be created by the processor and may be stored in memory.

For example, in the control method, attachment information indicating whether the wearable terminal is attached to the user may be further received from the wearable terminal, it may be deiced from the received attachment information whether the wearable terminal is attached to the user, and a control may be made in the above control so that, if it is decided that the wearable terminal is not attached to the user, then even if it is detected that the communication terminal is not being manipulated, the notifier in the communication terminal is notified of the information indicating the push notification without transmitting the notification information to the wearable terminal.

Thus, when the wearable terminal is not attached to the user, it is possible to prevent a push notification from being indicated to the wearable terminal. Therefore, it is possible to suppress the battery in the wearable terminal from being consumed.

For example, if it is detected that the wearable terminal is attached to the user and it has been detected that the communication terminal is not being manipulated, a control may be made in the above control so that the notification information is transmitted to the wearable terminal.

For example, the notification information may further include information indicating a notification intensity. In the above control method, biological information about the user may be further received from the wearable terminal, the biological information having been detected by the wearable terminal. In a control to transmit the notification information to the wearable terminal, a control may be made so that the larger a value indicating the degree of the user's activity is, the value being included in the received biological information, the higher the notification intensity indicated by information included in the notification information to be transmitted to the wearable terminal is.

Accordingly, in a case in which the user with the wearable terminal attached is exercising or is under tension, it is possible to prevent the user from failing to notice (being unable to recognize) a push notification of which the user has been notified. That is, even if the user with the wearable terminal attached is exercising or under tension, it is possible to have the user recognize a push notification.

For example, the notification information may further include information indicating a notification intensity. In the above control method, acceleration information about the wearable terminal may be further received from the wearable terminal, the acceleration information having been detected by the wearable terminal. In a control to transmit the notification information to the wearable terminal, a control may be made so that the larger a value indicated by the received acceleration information is, the higher the notification intensity indicated by information included in the notification information to be transmitted to the wearable terminal is.

Accordingly, it is possible to prevent the user from failing to notice (being unable to recognize) a push notification of which the user has been notified because the user with the wearable terminal attached is exercising or is under tension. That is, even if the user with the wearable terminal attached is exercising or under tension, it is possible to have the user recognize a push notification.

For example, after it has been decided that the wearable terminal is not attached to the user, then if attachment information indicating that the wearable terminal has been attached to the user is received and it has been detected that the communication terminal is not being manipulated, a control may be further made in the above control so that the notification information is transmitted to the wearable terminal.

Therefore, it is possible not only to suppress a push notification from being transmitted to the wearable terminal when the wearable terminal is not attached to the user, but also to transmit a push notification to the wearable terminal at a time when the wearable terminal is attached to the user, that is, at a time when the user is ready to recognize the contents of a notification.

For example, the wearable terminal can be controlled as to whether the user can manipulate the wearable terminal. After it has been decided that the wearable terminal is not attached to the user, then if attachment information indicating that the wearable terminal has been attached to the user and manipulation control information indicating that the wearable terminal has been changed to a state in which the wearable terminal is ready for being manipulated are received from the wearable terminal and it has been detected that the communication terminal is not being manipulated, a control may be further made in the above control so that the notification information is transmitted to the wearable terminal.

Therefore, it is possible to suppress a push notification from being transmitted to the wearable terminal when the wearable terminal is not attached to the user. However, at a time when the user is ready to recognize the contents of a notification, that is, at a time when the wearable terminal is attached to the user, is unlocked, and is ready for accepting information indicating a push notification, the push notification can be transmitted to the wearable terminal.

For example, in the control method, a decision may be further made as to whether the wearable terminal and communication terminal have been mutually connected via a network. If it is decided that the wearable terminal and communication terminal have not been mutually connected, a control may be made in the above control so that the notifier in the communication terminal is notified of the information indicating the push notification without transmitting the notification information to the wearable terminal. After the wearable terminal and communication terminal have been decided not to have been mutually connected, then if it is decided that the wearable terminal and communication terminal have been mutually connected and it has been detected that the communication terminal is not being manipulated, a control may be made so that the notification information is transmitted to the wearable terminal.

Therefore, it is possible not only to suppress a push notification from being transmitted to the wearable terminal when a connection has not been established between the wearable terminal and the communication terminal, but also to transmit a push notification to the wearable terminal at a time when a connection is established between the wearable terminal and the communication terminal and the user is ready to recognize the contents of a notification on the wearable terminal.

For example, the wearable terminal may be capable of detecting whether the wearable terminal is attached to the user and may be capable of notifying the user of information. If the wearable terminal detects that the wearable terminal is attached to the user, the user may be notified of the information indicating the push notification, the information being included in the notification information.

For example, the wearable terminal may be capable of notifying the user of information. The notification information may further include a notification command that causes the wearable terminal to notify the user of the information indicating the push notification, the information being included in the notification information.

For example, the wearable terminal may be capable of notifying the user of information. The notification information may further include flag information that indicates whether the communication terminal is being manipulated and may be used by the wearable terminal to make a decision as to whether to notify the user of the information indicating the push notification, the information being included in the notification information.

A communication terminal in one aspect of the present disclosure is, for example, a communication terminal that can be connected to a wearable terminal via a network, the wearable terminal being attachable to part of the body of a user. The communication terminal includes a communicator that communicates with the wearable terminal via the network, a detector that detects whether the communication terminal is being manipulated, a memory that stores a push notification in an application installed in the communication terminal, a notifier that is notified of the information indicating the push notification in the application, and a controller that operates so that, if it has been detected by the detector that the communication terminal is not being manipulated, the controller causes the communicator to transmit, to the wearable terminal, notification information that includes the information indicating the push notification stored in the memory, and, if it has been detected by the detector that the communication terminal is being manipulated, the controller notifies the notifier of the information indicating the push notification without causing the communicator to transmit the notification information to the wearable terminal.

A communication system in one aspect of the present disclosure is, for example, a communication system that includes a wearable terminal attachable to part of the body of a user and a communication terminal connectable to the wearable terminal via a network. The communication terminal includes a communicator that communicates with the wearable terminal via the network, a detector that detects whether the communication terminal is being manipulated, a memory that stores a push notification in an application installed in the communication terminal, a notifier that is notified of the information indicating the push notification in the application, and a controller that operates so that, if it has been detected by the detector that the communication terminal is not being manipulated, the controller causes the communicator to transmit, to the wearable terminal, notification information that includes the information indicating the push notification stored in the memory, and, if it has been detected by the detector that the communication terminal is being manipulated, the controller notifies the notifier of the information indicating the push notification without causing the communicator to transmit the notification information to the wearable terminal.

Upon receipt of the notification information, the wearable terminal attachable to part of the body of the user, the wearable terminal being part of the communication system in one aspect of the present disclosure, may notify the user of the notification information.

Embodiments described below are only specific examples of the present disclosure. Numerals, shapes, constituent elements, steps, the sequence of these steps, and the like are only examples, and are not intended to restrict the present disclosure. Of the constituent elements in the embodiments below, constituent elements not described in independent claims, each of which indicates the topmost concept of the present disclosure, will be described as arbitrary constituent elements. Contents in all embodiments may be combined.

Embodiment

Entire Structure

Figure 1:
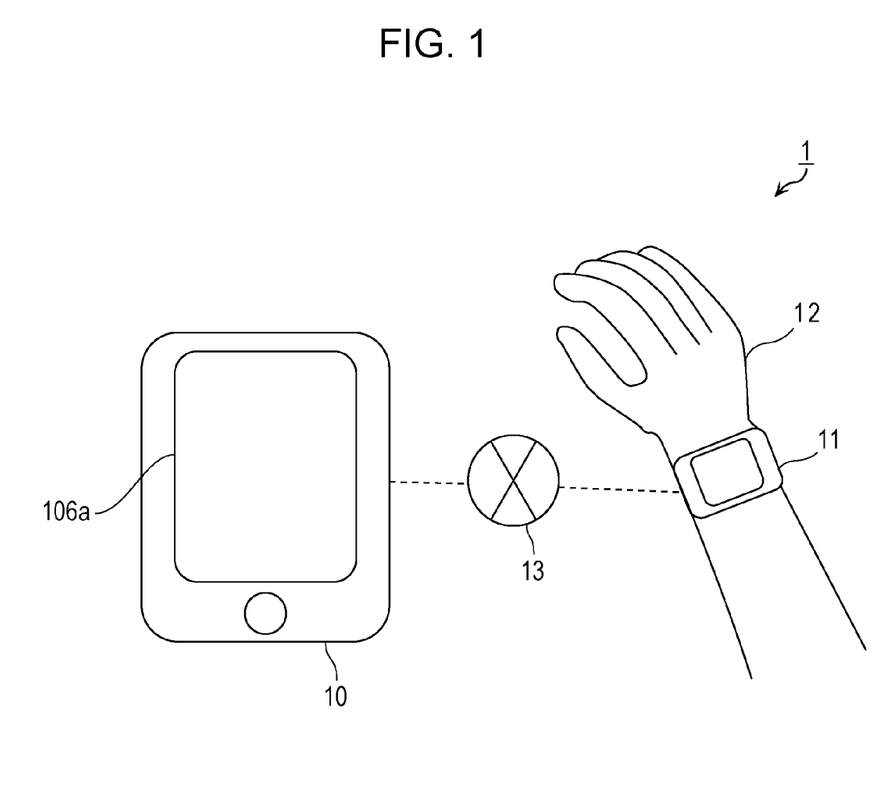
FIG. 1 illustrates an example of the entire structure of a communication system in an embodiment.
Figure 2:
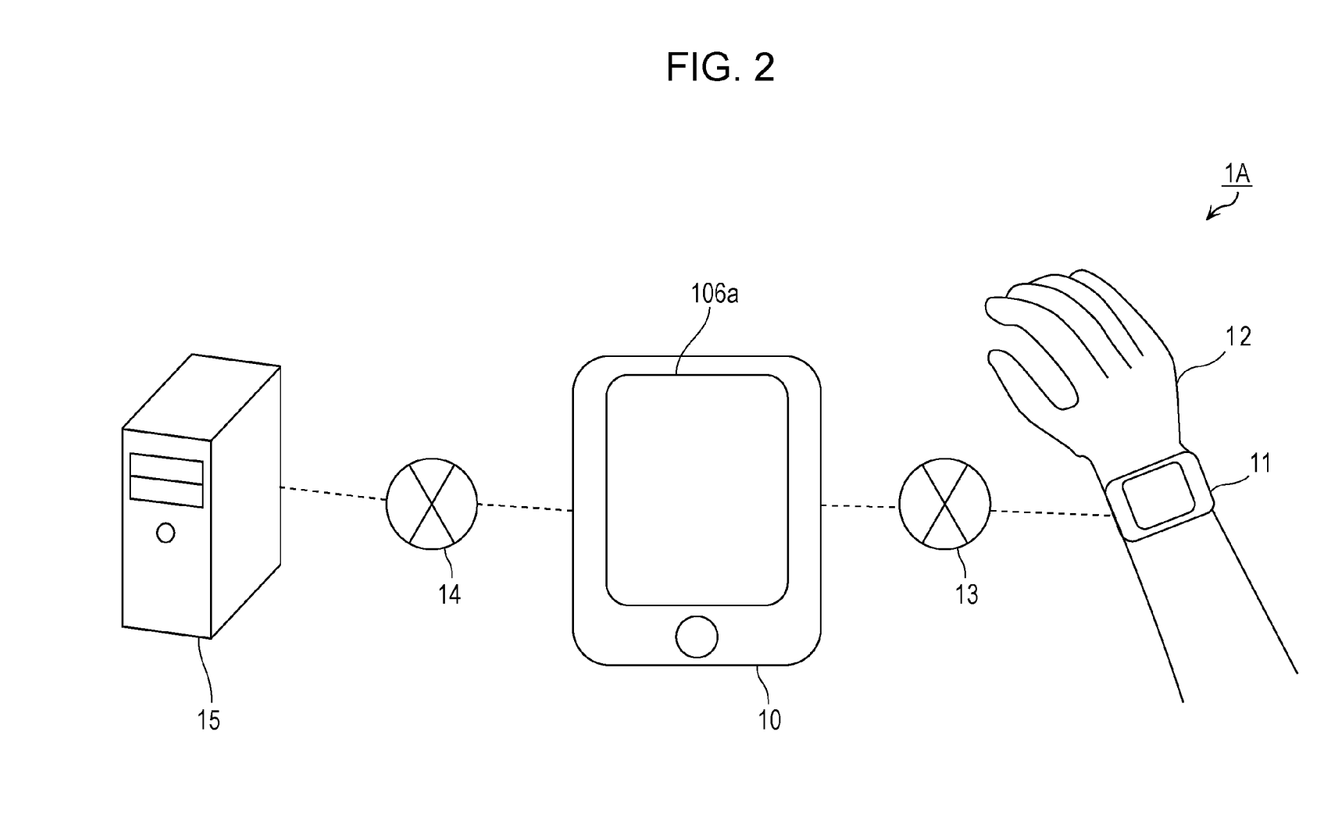
FIG. 2 illustrates an example of the entire structure of another communication system in an embodiment.

First, the entire structure of a communication system 1 in this embodiment will be described. FIG. 1 illustrates an example of the entire structure of a communication system in this embodiment. FIG. 2 illustrates an example of the entire structure of another communication system in an embodiment.

The communication system 1 illustrated in FIG. 1 has a communication terminal 10 and a wearable terminal 11. The communication system 1 may be a communication system 1A illustrated in FIG. 2. That is, the communication terminal 10 may be capable of communicating with an external server 15, as in the communication system 1A. The external server 15 may be included or may not be included in the communication system 1A.

FIGS. 1 and 2 each illustrate an example in which a wearable terminal 11 is attached to an arm 12 of a user as a band-type (wristwatch-type) device.

The wearable terminal 11, which is a device attachable to part of the body of the user, can be connected to the communication terminal 10 via a network 13. The wearable terminal 11 can notify the user of information. The wearable terminal 11 may be capable of detecting whether the wearable terminal 11 is attached to the user. The method by which the wearable terminal 11 notifies the user is such that if, for example, the wearable terminal 11 has a display, the wearable terminal 11 displays information of which the wearable terminal 11 notifies the user. Alternatively, if the wearable terminal 11 has a speaker mechanism, the wearable terminal 11 may generate a sound to indicate that there is information of which the wearable terminal 11 notifies the user or may generate a voice that indicate information itself of which the wearable terminal 11 notifies the user. Alternatively, if the wearable terminal 11 has a vibration mechanism, the wearable terminal 11 may generate a vibration to indicate that there is information of which the wearable terminal 11 notifies the user.

The wearable terminal 11 is not limited to a band-type (wristwatch-type) device as illustrated in FIGS. 1 and 2. The wearable terminal 11 may be an eyeglass-type device or a head-mounted device. That is, the wearable terminal 11 may be any device that can be attached to part of the body of the user and can notify the user of information.

The network 13 is, for example, a wireless communication network conforming to Bluetooth (registered trademark) or based on WiFi.

The communication terminal 10 is, for example, a computer that the user can carry, such as a smartphone or tablet. The communication terminal 10 can be connected to the wearable terminal 11 via the network 13. In the descriptions below, the communication terminal 10 will be assumed to be a smartphone that has a touch panel display 106a. Although described later in detail, the communication terminal 10 displays, on the touch panel display 106a, a push notification in an application installed in the communication terminal 10, and transmits the push notification to the wearable terminal 11, for example. In the example in FIG. 1, the communication terminal 10 creates a push notification in a specific application by itself. In addition, the communication terminal 10 may be capable of being connected to the external server 15 via a network 14 as illustrated in FIG. 2. In this arrangement, the communication terminal 10 receives the push notification from the external server 15.

The network 14 is, for example, the Internet or a WiFi network. The external server 15 creates a push notification in a specific application installed in the communication terminal 10 and transmits the push notification to the communication terminal 10 via the network 14.

Structure of the Communication Terminal 10

The communication terminal 10 will be described below in detail.

First, the hardware structure of the communication terminal 10 will be described with reference to FIG. 3.

Figure 3:
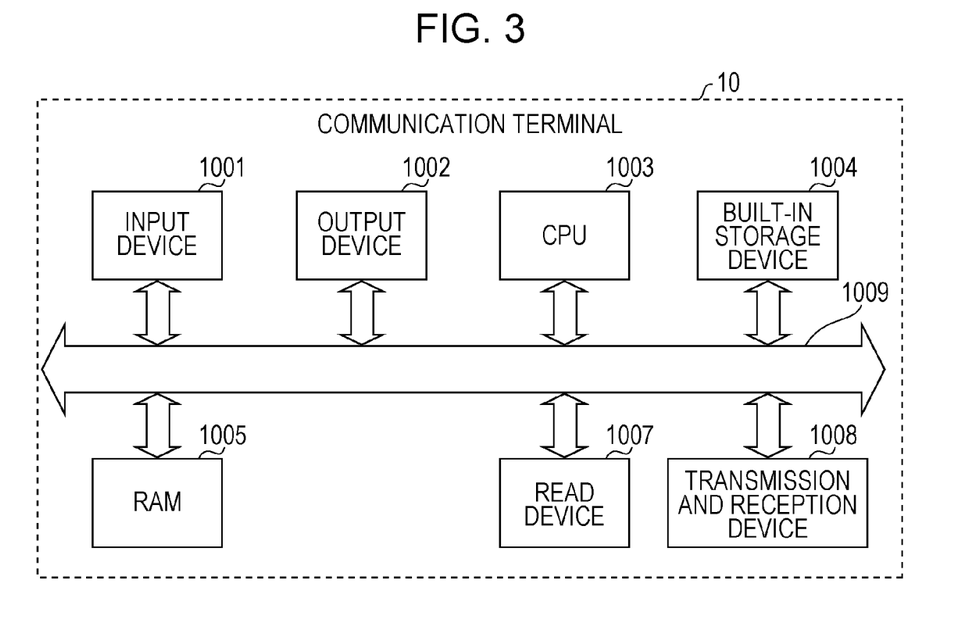
FIG. 3 illustrates an example of the hardware structure of a computer that implements functions of a communication terminal in an embodiment with software.

FIG. 3 illustrates an example of the hardware structure of a computer that implements functions of the communication terminal 10 in this embodiment with software.

As illustrated in FIG. 3, the communication terminal 10 is a computer that has an input device 1001, an output device 1002, a central processing unit (CPU) 1003, a built-in storage device 1004, a random-access memory (RAM) 1005, a read device 1007, a transmission and reception device 1008, and a bus 1009. The input device 1001, output device 1002, CPU 1003, built-in storage device 1004, RAM 1005, read device 1007, and transmission and reception device 1008 are mutually connected through the bus 1009.

The input device 1001 has buttons, a touch pad, a touch panel display, or another user interface. The input device 1001 accepts a manipulation performed by the user. In addition to accepting a contact manipulation performed by the user, the input device 1001 may accept a voice-based manipulation and a remote manipulation performed with a remote controller or the like.

The built-in storage device 1004 is, for example, a flash memory. In the built-in storage device 1004, programs that implement the functions of the communication terminal 10 and applications that use the functions of the communication terminal 10 may be prestored.

The RAM 1005 is employed to store data and the like that are used during the execution of programs and applications.

The read device 1007 reads information from a universal serial bus (USB) memory and other storage media. From storage media in which programs and application as described above are stored, the read device 1007 reads these programs and applications and stores them in the built-in storage device 1004.

The transmission and reception device 1008 is a communication circuit that performs wireless or wired communication. The transmission and reception device 1008 communicates with, for example, a server device connected to a network to download programs and applications as described above and stores them in the built-in storage device 1004.

The CPU 1003 copies programs and applications stored in the built-in storage device 1004 to the RAM 1005, and sequentially reads out commands included in the programs and applications from the RAM 1005 and executes these the commands.

Next, the functional constituent elements of the communication terminal 10 will be described with reference to FIGS. 4 and 5.

Figure 4:
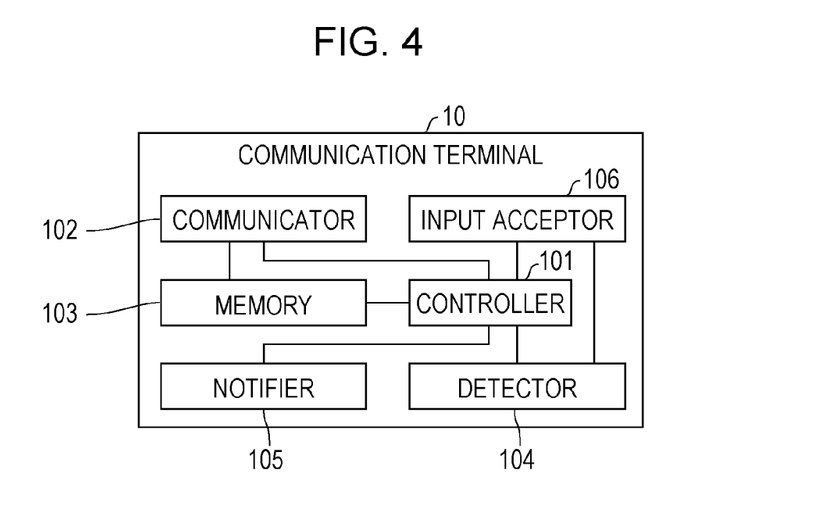
FIG. 4 is a functional block diagram illustrating the structure of the communication terminal in the embodiment.
Figure 5:
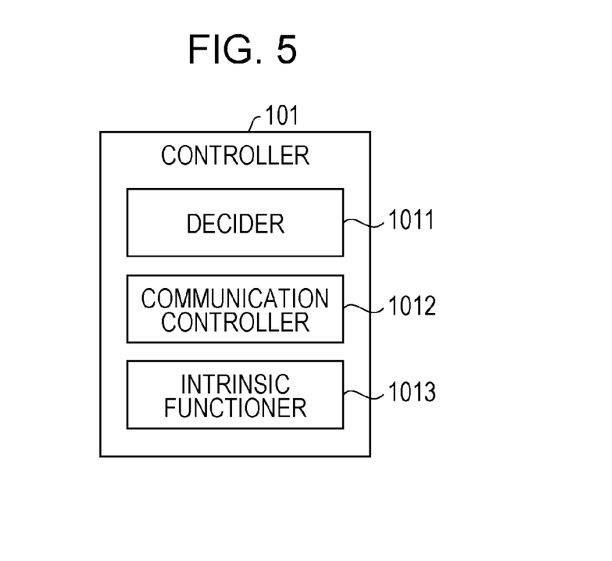
FIG. 5 is a block diagram illustrating the structure of a controller in FIG. 4 in detail.

FIG. 4 is a functional block diagram illustrating the structure of the communication terminal 10 in this embodiment. FIG. 5 is a block diagram illustrating the structure of a controller 101 in FIG. 4 in detail.

As illustrated in FIG. 4, the communication terminal 10 has the controller 101, a communicator 102, a memory 103, a detector 104, a notifier 105, and an input acceptor 106.

The communicator 102, which is implemented by the CPU 1003, the transmission and reception device 1008, and the like, has a function that communicates with the wearable terminal 11 via the network 13. The communicator 102 may have a function that communicates with the external server 15 illustrated in FIG. 2 via the network 14. In this embodiment, the communicator 102 can communicate with the wearable terminal 11 via the network 13, so the communicator 102 receives, from the wearable terminal 11, attachment information that indicates whether the wearable terminal 11 is attached to the user. The communicator 102 can communicate with the external server 15 via the network 14, so the communicator 102 may receive, from the external server 15, a push notification in an application installed in the communication terminal 10 or a command that creates the push notification.

Under control of the controller 101, the communicator 102 transmits, to the wearable terminal 11, notification information that includes information indicating a push notification stored in the memory 103.

The memory 103, which is implemented by the built-in storage device 1004 and the like, has a function that stores a push notification in an application installed in the communication terminal 10. In this embodiment, a push notification created by the communication terminal 10 is stored in the memory 103. If the communication terminal 10 receives a push notification from the external server 15, the received push notification is stored in the memory 103.

Figure 6:
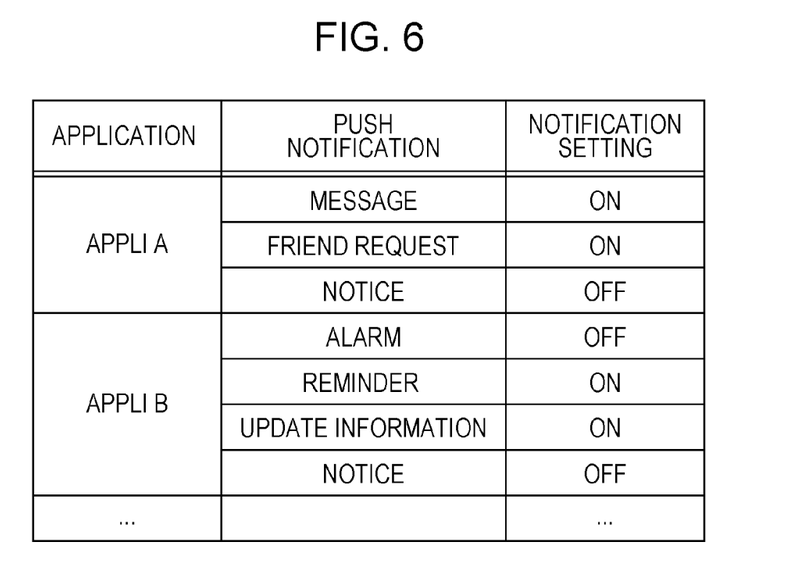
FIG. 6 illustrates a push notification in an application, the push notification being in an embodiment.

Now, a push notification, in an application, that is stored in the memory 103 will be described with reference to FIG. 6. FIG. 6 illustrates a push notification in an application, the push notification being in this embodiment.

In a push notification, an application notifies the user of contents that are permitted to the user in advance, without the user having to activate the application in the communication terminal 10. In this embodiment, a plurality of applications that include at least application A and application B have been installed in the communication terminal 10. In the example in FIG. 6, the contents of push notifications in application A are a message, a friend request, and a notice. Of these, the message and friend request are permitted to the user in advance. Similarly, the contents of push notifications in application B in the example in FIG. 6 are an alarm, a reminder, update information, and a notice. Of these, the reminder and update information are permitted to the user in advance.

The notifier 105 has a function that notifies the user of information indicating a push notification in an application. In this embodiment, the notifier 105 is the touch panel display 106a and displays, for example, information indicating a push notification.

The notifier 105 is not limited to the touch panel display 106a. For example, the notifier 105 may be a display and may display information indicating a push notification. Alternatively, the notifier 105 may have a vibration function and may generate a vibration to notify the user of information indicating a push notification. Alternatively, the notifier 105 may have a voice generating function and may generate a sound to notify the user of information indicating a push notification.

The input acceptor 106 has a function that accepts a manipulation input performed by the user. In this embodiment, the input acceptor 106 is the touch panel display 106a.

The detector 104 detects whether the communication terminal 10 is being manipulated. In this embodiment, if information is displayed on the touch panel display 106a of the communication terminal 10, the detector 104 detects that the communication terminal 10 is being manipulated; if information is not displayed on the touch panel display 106a, the detector 104 detects that the communication terminal 10 is not being manipulated. In addition, for example, if the input acceptor 106 is accepting a manipulation input performed by the user, the detector 104 detects that the communication terminal 10 is being manipulated. If the input acceptor 106 is not accepting a manipulation input, detector 104 detects that the communication terminal 10 is not being manipulated.

The controller 101 has functions that control the communicator 102, memory 103, detector 104, notifier 105, and input acceptor 106.

If it has been detected by the detector 104 that the communication terminal 10 is not being manipulated, the controller 101 causes the communicator 102 to transmit, to the wearable terminal 11, the notification information that includes the information indicating the push notification stored in the memory 103. If it has been detected by the detector 104 that the communication terminal 10 is being manipulated, the controller 101 causes the communicator 102 to transmit the information indicating the push notification to the notifier 105, without causing the communicator 102 to transmit the notification information to the wearable terminal 11. In this embodiment, the controller 101 has a decider 1011, a communication controller 1012, and an intrinsic functioner 1013, as illustrated in FIG. 5.

The intrinsic functioner 1013 is a function that makes a control so that intrinsic functions of the communication terminal 10 such as a call function and a communication function are derived. In this embodiment, the intrinsic functioner 1013 creates a push notification in response to a command to create a push notification, the command being received at the communicator 102, and stores the created push notification in the memory 103. Furthermore, the intrinsic functioner 1013 creates a push notification in advance so as to use the push notification at a scheduled time determined by a timer function or a calendar function and stores the created push notification in the memory 103.

The decider 1011 decides whether the wearable terminal 11 is attached to the user. For example, in a case in which the communicator 102 receives attachment information that indicates whether the wearable terminal 11 is attached to the user, the decider 1011 may decide whether the wearable terminal 11 is attached to the user, according to the received attachment information.

If it is decided by the decider 1011 that the wearable terminal 11 is not attached to the user, then even if it has been detected by the detector 104 that the communication terminal 10 is not being manipulated, the communication controller 1012 may make a control so as to notify the notifier 105 in the communication terminal 10 of information indicating a push notification, without transmitting the notification information to the wearable terminal 11. If it is decided by the decider 1011 that the wearable terminal 11 is attached to the user and it has been detected by the detector 104 that the communication terminal 10 is not being manipulated, the communication controller 1012 may make a control so that the notification information is transmitted to the wearable terminal 11.

If the push notification stored in the memory 103 (push notification received at the communicator 102 or push notification created by the controller 101) is neither selected nor viewed on the communication terminal 10, the communication controller 1012 may make a control so that notification information that includes information indicating the push notification is transmitted to the wearable terminal 11, assuming that the communication terminal 10 is not being manipulated. Cases in which a push notification is selected or viewed on the communication terminal 10 include, for example, a case in which the push notification has been already read on the touch panel display 106a of the communication terminal 10, a case in which the push notification has been already displayed on the touch panel display 106a of the communication terminal 10, and a case in which an application that transmits a push notification has been activated.

Operations of the Communication Terminal 10

Next, examples of operations of the communication terminal 10 structured as described above will be described with reference to FIGS. 7 to 9.

Figure 7:
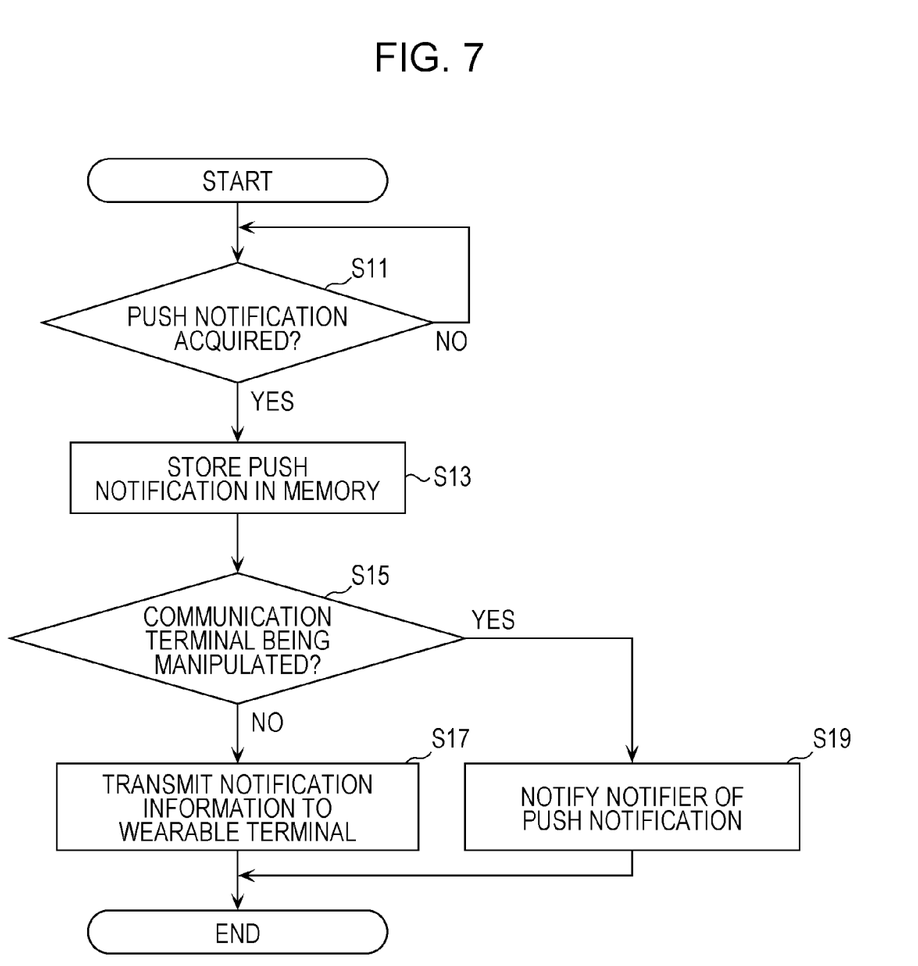
FIG. 7 is a flowchart illustrating an example of an operation of the communication terminal in the embodiment.

FIG. 7 is a flowchart illustrating an example of an operation of the communication terminal 10 in this embodiment. An operation of the communication terminal 10 will be described with reference to FIG. 7.

First, if the communication terminal 10 acquires (receives or creates) a push notification in an application installed in the communication terminal 10 (the result in S11 is Yes), the communication terminal 10 stores the push notification in the memory 103 in the communication terminal 10 (S13). To acquire a push notification, the communicator 102 may receive a push notification from the external server 15 via the network 14 or the controller 101 may create a push notification in an application, as described above.

Next, the communication terminal 10 detects whether the communication terminal 10 is being manipulated (S15).

If the communication terminal 10 detects that the communication terminal 10 is being manipulated (the result in S15 is Yes), the communication terminal 10 makes a control so that the notifier 105 is notified of the information indicating the push notification that has been stored in the memory 103 in S13 (S19), without transmitting the notification information to the wearable terminal 11. If the communication terminal 10 detects that the communication terminal 10 is not being manipulated (the result in S15 is No), the communication terminal 10 makes a control so that the notification information that includes the information indicating the push notification that has been stored in the memory 103 in S13 is transmitted to the wearable terminal 11 (S17).

Although, in the example of the operation in FIG. 7, it has been described that the push notification is indicated without deciding whether the wearable terminal 11 is attached to the user, it may be decided whether the wearable terminal 11 is actually attached to the user before the push notification is indicated. An example of an operation in this case will be described below with reference to FIGS. 8 and 9.

Figure 8:
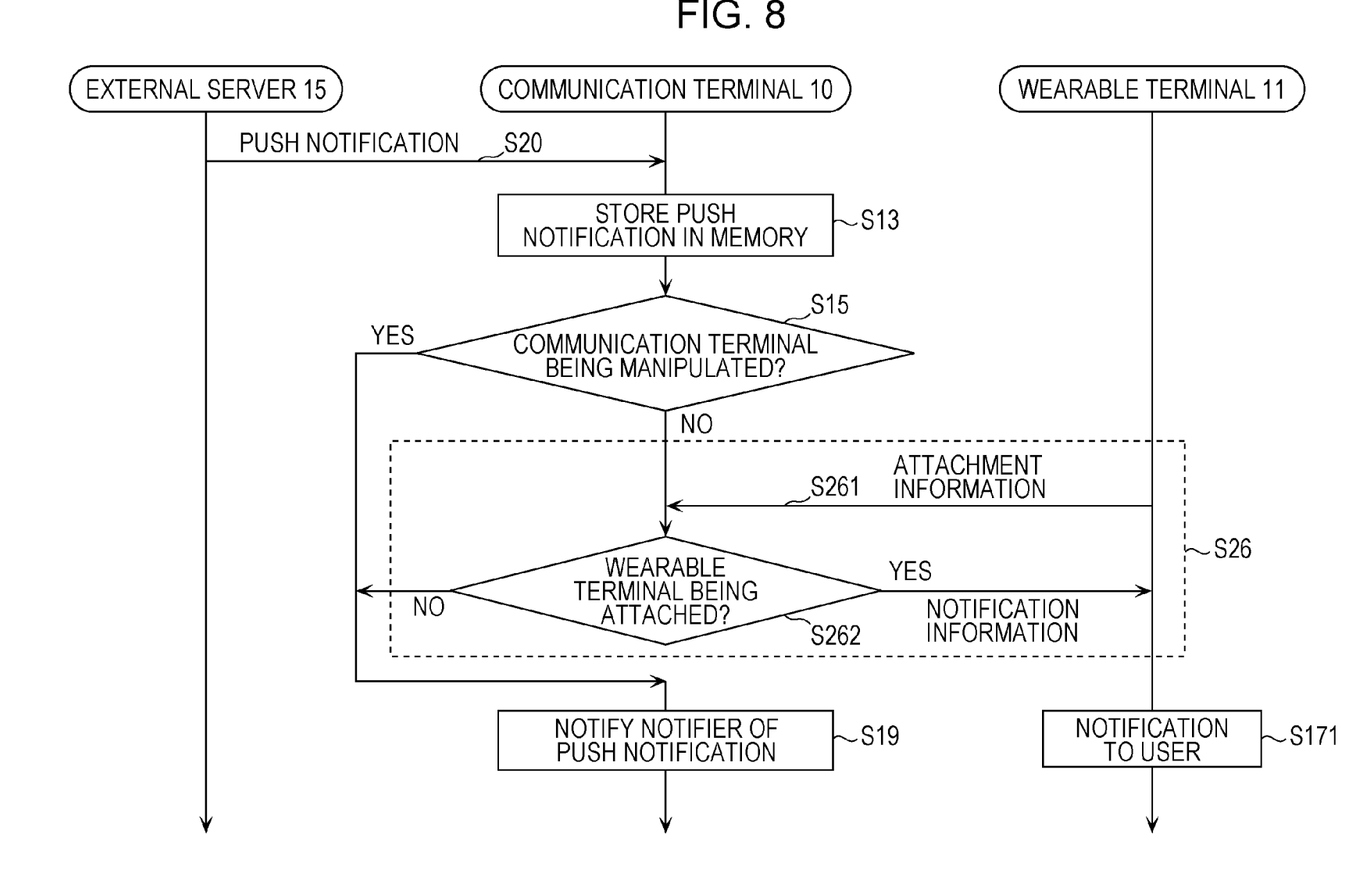
FIG. 8 is a sequence diagram illustrating an example of another operation of the communication terminal in the embodiment.
Figure 9:
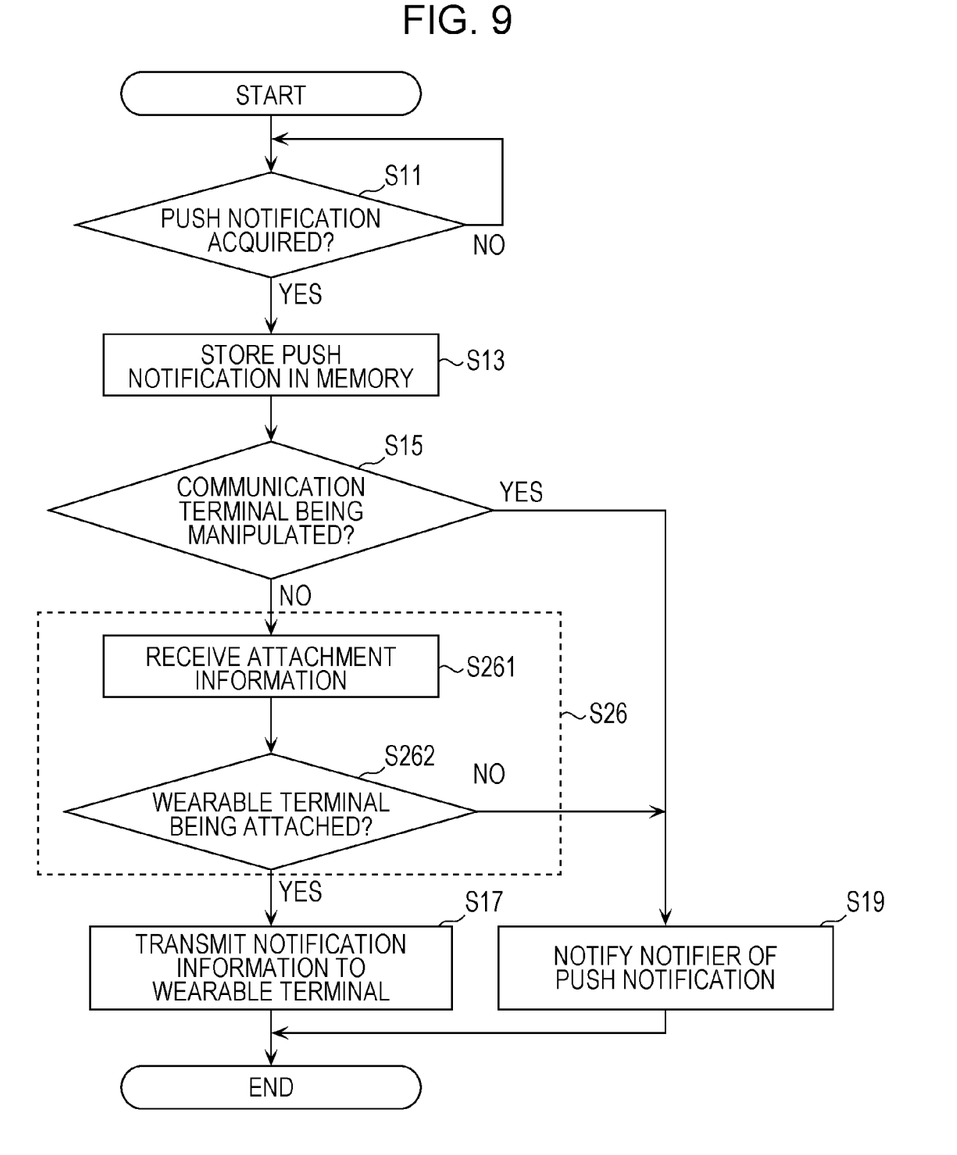
FIG. 9 is a flowchart illustrating the example of the other operation of the communication terminal in FIG. 8.

FIG. 8 is a sequence diagram illustrating an example of another operation of the communication terminal 10 in this embodiment. FIG. 9 is a flowchart illustrating the example of the other operation of the communication terminal 10 in FIG. 8. The sequence diagram in FIG. 8 indicates a case in which the communication terminal 10 receives a push notification from the external server 15. In FIG. 8, steps that are the same as in FIG. 7 are given the same step numbers.

First, the external server 15 transmits a push notification in an application installed in the communication terminal 10 (S20 in FIG. 8).

Then, the communication terminal 10 acquires (receives) the push notification in an application installed in the communication terminal 10 (the result in S11 in FIG. 9 is Yes), after which the communication terminal 10 stores, in its memory 103, the push notification in an application installed in the communication terminal 10 (S13).

Next, the communication terminal 10 detects whether the communication terminal 10 is being manipulated (S15).

If the communication terminal 10 detects that the communication terminal 10 is not being manipulated (the result in S15 is No), the communication terminal 10 further performs wearable terminal attachment deciding processing (S26). Specifically, the communication terminal 10 receives attachment information, which indicates whether the wearable terminal 11 is attached to the user, from the wearable terminal 11 in S26 (S261), and decides whether the wearable terminal 11 is attached to the user, according to the received attachment information (S262).

If the communication terminal 10 decides in S262 that the wearable terminal 11 is attached to the user (the result in S262 is Yes), the communication terminal 10 makes a control so that the notification information that includes the information indicating the push notification that has been stored in the memory 103 in S13 is transmitted to the wearable terminal 11. Upon receipt of the notification information that includes the information indicating the push notification, the wearable terminal 11 notifies the user of the information indicating the push notification (S171).

If the communication terminal 10 detects that the communication terminal 10 is being manipulated (the result in S15 is Yes) or decides that the wearable terminal 11 is not attached to the user (the result in S262 is No), the communication terminal 10 makes a control so that the notifier 105 in the communication terminal 10 is notified of the information indicating the push notification that has been stored in the memory 103 in S13 without transmitting the notification information to the wearable terminal 11 (S19).

Although, in the example of the operation illustrated in FIGS. 8 and 9, it has been described that the communication terminal 10 decides whether the wearable terminal 11 is actually attached to the user, this is not a limitation. The wearable terminal 11 itself may decide whether it is actually attached to the user. An example of an operation in this case will be described below with reference to FIG. 10.

Figure 10:
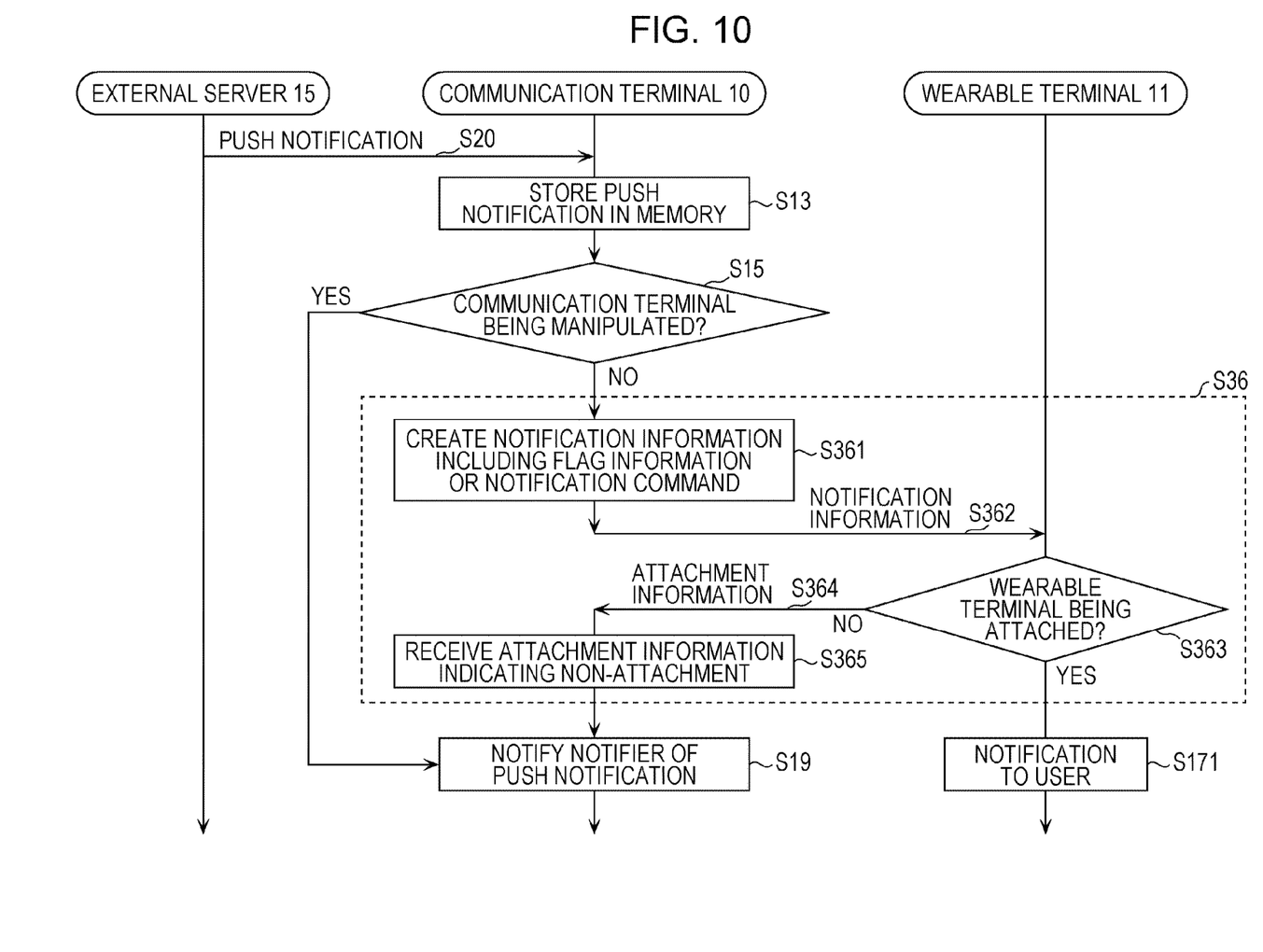
FIG. 10 is a sequence diagram illustrating an example of yet another operation of the communication terminal in the embodiment.

FIG. 10 is a sequence diagram illustrating an example of yet another operation of the communication terminal 10 in this embodiment. The sequence diagram in FIG. 10 indicates a case in which the communication terminal 10 receives a push notification from the external server 15, as in FIG. 8. In FIG. 10, steps that are the same as in FIG. 8 are given the same step numbers and their detailed descriptions will be omitted. Specifically, processing in S20, S13, S15, S17, and S19 is the same as in FIG. 8, and its descriptions will be omitted.

If, in S15, the communication terminal 10 detects that the communication terminal 10 is not being manipulated (the result in S15 is No), the communication terminal 10 further performs wearable terminal attachment deciding processing (S36).

Specifically, in S36, the communication terminal 10 first creates notification information that includes flag information or a notification command (S361) and transmits the notification information to the wearable terminal 11 (S362). The flag information indicates whether the communication terminal 10 is being manipulated and is used by the wearable terminal 11 to make a decision as to whether to notify the user of information, included in the notification information, that indicates a push notification. In the example illustrated in FIG. 10, the flag information indicates that the communication terminal 10 is not being manipulated. The notification command is a command that causes the wearable terminal 11 to notify the user of the information, included in the notification information, that indicates the push notification.

Next, the wearable terminal 11 decides whether the wearable terminal 11 is attached to the user (S363). Specifically, when the wearable terminal 11 receives notification information that includes a notification command or flag information indicating that the communication terminal 10 is not being manipulated, the wearable terminal 11 detects whether the wearable terminal 11 is attached to the user to make a decision.

If the wearable terminal 11 decides that the wearable terminal 11 is attached to the user (the result in S363 is Yes), the wearable terminal 11 notifies the user of the information indicating the push notification (S171).

If the wearable terminal 11 decides that the wearable terminal 11 is not attached to the user (the result in S363 is No), the wearable terminal 11 transmits, to the communication terminal 10, attachment information indicating that the wearable terminal 11 is not attached to the user (S364). In this case, when the communication terminal 10 receives the attachment information indicating that the wearable terminal 11 is not attached to the user (S365), the communication terminal 10 makes a control so that the notifier 105 in the communication terminal 10 is notified of the information indicating the push notification that has been stored in the memory 103 in S13 (S19).

Effects and the Like

As described above, in the control method in one aspect of the present disclosure, a processor in the communication terminal 10 that can be connected to the wearable terminal 11 via the network 13, the wearable terminal 11 being attachable to part of the body of the user, is caused to control the communication terminal 10. The processor stores, in the memory 103 in the communication terminal 10, a push notification in an application installed in the communication terminal 10; the processor detects whether the communication terminal 10 is being manipulated; if it has been detected that the communication terminal 10 is not being manipulated, the processor makes a control so that notification information that includes information indicating the push notification is transmitted to the wearable terminal 11; if it has been detected that the communication terminal 10 is being manipulated, the processor makes a control so that the notifier 105 in the communication terminal 10 is notified of the information indicating the push notification without transmitting the notification information to the wearable terminal 11.

Thus, while manipulating the communication terminal 10, the user can check a push notification on the communication terminal 10, so it is possible to prevent a push notification from being indicated to the wearable terminal 11 while the user is manipulating the communication terminal 10. Therefore, it is possible to suppress the activity of the user with the wearable terminal 11 attached from being impaired and to suppress a battery in the wearable terminal 11 from being consumed.

In the control method in one aspect of the present disclosure, attachment information indicating whether the wearable terminal 11 is attached to the user may be further received from the wearable terminal 11, it may be decided from the received attachment information whether the wearable terminal 11 is attached to the user, and a control may be made in the above control so that, if it is decided that the wearable terminal 11 is not attached to the user, then even if it is detected that the communication terminal 10 is not being manipulated, the notifier 105 in the communication terminal 10 is notified of the information indicating the push notification without transmitting the notification information to the wearable terminal 11.

Thus, when the wearable terminal 11 is not attached to the user, it is possible to prevent a push notification from being indicated to the wearable terminal 11. Therefore, it is possible to suppress the battery in the wearable terminal 11 from being consumed.

First Modification

Although, in the above embodiment, it has been described that, if the communication terminal 10 decides that the wearable terminal 11 is not attached to the user, the communication terminal 10 does not transmit a push notification to the wearable terminal 11, this is not a limitation. For example, after the communication terminal 10 has decided that the wearable terminal 11 is not attached to the user, then if the communication terminal 10 receives attachment information indicating that the wearable terminal 11 has been attached to the user and it has been detected that the communication terminal 10 is not being manipulated, the communication terminal 10 may transmit the push notification to the wearable terminal 11.

Therefore, the communication terminal 10 can suppress a push notification from being transmitted to the wearable terminal 11 when the wearable terminal 11 is not attached to the user. However, at a time when the wearable terminal 11 is attached to the user and the user is ready to recognize the contents of a notification on the wearable terminal 11, the communication terminal 10 can transmit the push notification to the wearable terminal 11.

Second Modification

Although, in the above embodiment, it has been described that a wireless communication network, for example, conforming to Bluetooth (registered trademark) or based on WiFi has been mutually connected between the wearable terminal 11 and the communication terminal 10, this is not a limitation.

The controller 101 in the communication terminal 10 may decide whether the wearable terminal 11 and communication terminal 10 have been mutually connected via the network 13. If the controller 101 decides that the wearable terminal 11 and communication terminal 10 have not been mutually connected, the controller 101 can make a control so that the communicator 102 notifies the notifier 105 of the information indicating the push notification without transmitting the notification information to the wearable terminal 11. After the wearable terminal and communication terminal have been decided not to have been mutually connected, then if the controller 101 decides that the wearable terminal 11 and communication terminal 10 have been mutually connected and it has been detected that the communication terminal 10 is not being manipulated, the controller 101 may make a control so that the communicator 102 transmits the notification information to the wearable terminal 11.

Therefore, it is possible to suppress a push notification from being transmitted to the wearable terminal 11 when a connection has not been established between the wearable terminal 11 and the communication terminal 10 because, for example, the wearable terminal 11 is outside the communication range. However, at a time when a connection is established between the wearable terminal 11 and the communication terminal 10 because, for example, the wearable terminal 11 has entered the communication range and a connection has been restored and the user is ready to recognize the contents of a notification on the wearable terminal 11, the communication terminal 10 can transmit the push notification to the wearable terminal 11.

Third Modification

Although, in the above embodiment, it has been described that, when the wearable terminal 11 is attached to the user, the wearable terminal 11 is always active (in a state in which manipulation control is possible, that is, the wearable terminal 11 is unlocked), in which case, for example, a push notification can be received, this is not a limitation.

The wearable terminal 11 may be non-active (in a state in which manipulation control is not possible, that is, the wearable terminal 11 is locked), in which case the wearable terminal 11 cannot receive a push notification until the user enters a passcode or a gesture manipulation. That is, the wearable terminal 11 can be controlled as to whether the user can manipulate the wearable terminal 11.

In this case, for example, after the controller 101 in the communication terminal 10 has decided that the wearable terminal 11 is not attached to the user, then if the controller 101 receives attachment information indicating that the wearable terminal 11 has been attached to the user and manipulation control information indicating that the wearable terminal 11 has been changed to a state in which the wearable terminal 11 is ready for being manipulated and it has been detected that the communication terminal 10 is not being manipulated, the controller 101 may make a control so that the communicator 102 transmits the notification information to the wearable terminal 11.

Therefore, the communication terminal 10 can suppress a push notification from being transmitted to the wearable terminal 11 when the wearable terminal 11 is not attached to the user. However, at a time when the user is ready to recognize the contents of a notification, that is, at a time when the wearable terminal 11 is attached to the user, is unlocked, and is ready for accepting information indicating a push notification, the communication terminal 10 can be transmit the push notification to the wearable terminal 11.

Fourth Modification

Although, in the above embodiment, it has been described that the wearable terminal 11 can detect whether the wearable terminal 11 is attached to the user, this is not a limitation. The wearable terminal 11 may be further capable of detecting biological information about the user with the wearable terminal 11 attached, such as the user's heart rate, heart rate, or bloodstream.

In this case, the communicator 102 in the communication terminal 10 may transmit, to the wearable terminal 11, notification information that includes information indicating a notification intensity besides information indicating the push notification. The information indicating the notification intensity indicates an intensity with which the wearable terminal 11 notifies the user of the information indicating the push notification, the information being included in the notification information. If vibration of the wearable terminal 11, for example, is used to notify the user, the notification intensity is the intensity of the vibration. Alternatively, if a sound generated by the wearable terminal 11, for example, is used to notify the user, the notification intensity is the intensity of the sound.

Therefore, when the communication terminal 10 receives biological information about the user, the biological information having been detected by the wearable terminal 11, from the wearable terminal 11, the controller 101 in the communication terminal 10 may make a control so that the larger a value indicating the degree of the user's activity is, the value being included in the received biological information about the user, the higher the notification intensity indicated by information included in the notification information to be transmitted to the wearable terminal 11 is.

Accordingly, in a case in which the user with the wearable terminal 11 attached is exercising or is under tension, it is possible to prevent the user from failing to notice (being unable to recognize) a push notification of which the user has been notified. That is, even if the user with the wearable terminal 11 attached is exercising or under tension, it is possible to have the user recognize a push notification.

Fifth Modification

Although, in the fourth modification, a case has been described in which the wearable terminal 11 can detect biological information about the user with the wearable terminal 11 attached such as the user's heart rate, heart rate, or bloodstream, this is not a limitation. The wearable terminal 11 may be capable of detecting the acceleration of the wearable terminal 11.

Specifically, when the communication terminal 10 receives, from the wearable terminal 11, acceleration information that indicates the acceleration of the wearable terminal 11, the acceleration having been detected by the wearable terminal 11, the controller 101 in the communication terminal 10 may make a control so that the larger a value indicated by the received acceleration information about the wearable terminal 11 is, the higher the notification intensity indicated by information included in the notification information to be transmitted to the wearable terminal 11 is.

Accordingly, it is possible to prevent the user from failing to notice (being unable to recognize) a push notification of which the user has been notified because the user with the wearable terminal 11 attached is exercising or is under tension. That is, even if the user with the wearable terminal 11 attached is exercising or under tension, it is possible to have the user recognize a push notification.

Other Embodiments and the Like

The embodiment described above is only an example. It will be appreciated that various modifications, additions, omissions, and the like are possible.

The functions of the decider 1011 and communication controller 1012 in the controller 101 described above can be shared in any way. Part or all of the functions of one of these elements may be included in the other.

Part or a whole of the operational procedures described above for the communication terminal 10 and the like may be implemented by hardware in the communication terminal 10 or the like or may be implemented by software. Processing by software is implemented when a processor included in the communication terminal 10 or the like executes a control program stored in a memory. The control program may be distributed or placed on the market in the form of being recorded in a recording medium. For example, when the distributed control program is installed in an apparatus and is executed by a processor in the apparatus, the apparatus can perform, for example, part or a whole of the operations of the communication terminal 10 described above and the like.

The range of the present disclosure also includes embodiments implemented by combining arbitrary constituent elements and functions indicated in the embodiment described above.

Various comprehensive or specific aspects in the present disclosure include one of an apparatus, a system, a method, an integrated circuit, a computer program, a computer-readable recording medium, and the like or a plurality of combinations thereof.

In addition, the present disclosure includes embodiments obtained by applying various variations that a person having ordinary skill in the art thinks of to the embodiment described above, and also includes embodiments implemented by combining arbitrary constituent elements and functions in various embodiments without departing from the intended scope of the present disclosure.

The present disclosure can be used in, for example, a communication terminal, such as a smartphone or a tablet, and a method of controlling the communication terminal. Particularly, the present disclosure can be used in a method of controlling a communication terminal, such as a smartphone or a tablet, that can be connected to a wearable terminal attachable to part of the body of a user via a network, as well as in a communication terminal, a communication system, and a program.

What is claimed is:

1. A method causing a processor in a communication terminal to execute operations that include:
    detecting whether the communication terminal, which is connected via a network to a wearable terminal that is attached to part of a body of a user, is being manipulated;
    if the communication terminal is detected as not being manipulated, transmitting notification information that includes push notification to the wearable terminal;
    if the communication terminal is detected as being manipulated, controlling the communication terminal to notify the notification information to the user, without transmitting the notification information to the wearable terminal, wherein, the notification information further includes information indicating a notification intensity, biological information about the user is received from the wearable terminal, the biological information having been detected by the wearable terminal, and when the notification information is transmitted to the wearable terminal, the larger a value indicating a degree of activity of the user there is, the value being included in the biological information that has been received, the higher the notification intensity is, indicated by information included in the notification information to be transmitted to the wearable terminal.

2. The method according to claim 1, wherein,
the communication terminal has a display, and
the detecting detects whether the communication terminal is being manipulated,
if information is displayed on the display, the communication terminal is detected as being manipulated, and
if information is not displayed on the display, the communication terminal is detected as not being manipulated.

3. The method according to claim 1, wherein,
the communication terminal further has an input that accepts a manipulation input performed by the user, and
the detecting detects whether the communication terminal is being manipulated,
if the input is accepting the manipulation input, the communication terminal is detected as being manipulated, and
if the input is not accepting the manipulation input, the communication terminal is detected as not being manipulated.

4. The method according to claim 2, wherein
the transmitting assumes that, if the push notification is neither selected nor viewed on the communication terminal, the communication terminal has been detected as not being manipulated, the notification information that includes the information indicating the push notification is transmitted to the wearable terminal.

5. The method according to claim 1, wherein:
the communication terminal is further connectable to an external server via a network; and
the push notification is received from the external server and is stored in a memory of the communication terminal.

6. The method according to claim 1, wherein, the push notification having been generated by the processor, is stored in a memory of the communication terminal.

7. The method according to claim 1, wherein,
attachment information indicating whether the wearable terminal is attached to the user is received from the wearable terminal,
whether the wearable terminal is attached is determined from the attachment information that has been received, and
if the wearable terminal is determined not to have been attached to the user, then even if the communication terminal is detected as not being manipulated, the push notification is displayed on a display of the communication terminal without transmitting the notification information to the wearable terminal.

8. The method according to claim 7, wherein if the wearable terminal is determined to have been attached to the user and the communication terminal is detected as not being manipulated, the notification information is transmitted to the wearable terminal.

9. The method according to claim 8, wherein,
the notification information further includes information indicating a notification intensity,
acceleration information about the wearable terminal is received from the wearable terminal, the acceleration information having been detected by the wearable terminal, and
when the notification information is transmitted to the wearable terminal, the larger a value indicated by the acceleration information that has been received there is, the higher the notification intensity is, indicated by information included in the notification information to be transmitted to the wearable terminal.

10. The method according to claim 7, wherein,
after the wearable terminal is determined not to have been attached to the user, then if attachment information indicating that the wearable terminal has been attached to the user is received and the communication terminal is detected as not being manipulated, the notification information is transmitted to the wearable terminal.

11. The method according to claim 10, wherein,
the wearable terminal is capable of being controlled as to whether the user is capable of manipulating the wearable terminal, and
after the wearable terminal is determined not to have been attached to the user, then if the attachment information indicating that the wearable terminal has been attached to the user and manipulation control information indicating that the wearable terminal has been changed to a state in which the wearable terminal is ready for being manipulated are received from the wearable terminal and the communication terminal is detected as not being manipulated, the notification information is transmitted to the wearable terminal.

12. The method according to claim 1, wherein,
whether the wearable terminal and communication terminal have been mutually connected via a network is determined,
if the wearable terminal and communication terminal are determined not to have been mutually connected, a notification of information indicating the push notification is made without the notification information being transmitted to the wearable terminal, and
after the wearable terminal and communication terminal are determined not to have been mutually connected, then if the wearable terminal and communication terminal are determined to have been mutually connected and the communication terminal is detected as not being manipulated, the notification information is transmitted to the wearable terminal.

13. The method according to claim 1, wherein,
the wearable terminal is capable of detecting whether the wearable terminal is attached to the user and is capable of notifying the user of information, and
if the wearable terminal detects that the wearable terminal is attached to the user, the user is notified of the information indicating the push notification, the information being included in the notification information.

14. The method according to claim 1, wherein
the wearable terminal is capable of notifying the user of information, and the notification information further includes a notification command that causes the wearable terminal to notify the user of the information indicating the push notification, the information being included in the notification information.

15. The method according to claim 1, wherein,
the wearable terminal is capable of notifying the user of information,
the notification information further includes flag information that indicates whether the communication terminal is being manipulated, and
the flag information is used by the wearable terminal to make a decision as to whether to notify the user of the information indicating the push notification, the information being included in the notification information.

16. A communication terminal comprising:
a processor; and
a memory in which a computer program is stored, the computer program causing the processor to execute operations that include:
detecting whether the communication terminal, which is connected via a network to a wearable terminal that is attached to part of a body of a user, is being manipulated;
if the communication terminal is detected as not being manipulated, transmitting notification information that includes push notification to the wearable terminal;
if the communication terminal is detected as being manipulated, controlling the communication terminal to notify the notification information to the user, without transmitting the notification information to the wearable terminal,
wherein, the notification information further includes information indicating a notification intensity,
biological information about the user is received from the wearable terminal, the biological information having been detected by the wearable terminal, and
when the notification information is transmitted to the wearable terminal, the larger a value indicating a degree of activity of the user there is, the value being included in the biological information that has been received, the higher the notification intensity is, indicated by information included in the notification information to be transmitted to the wearable terminal.

17. A communication system comprising:
a wearable terminal that is attached to part of a body of a user; and
a communication terminal that is connected to the wearable terminal via a network, the communication terminal including a processor and a memory in which a computer program is stored; wherein
the computer program causes the processor to execute operations comprising:
detecting whether the communication terminal, which is connected via a network to the wearable terminal that is attached to part of a body of a user, is being manipulated;
if the communication terminal is detected as not being manipulated, transmitting notification information that includes push notification to a wearable terminal;
if the communication terminal is detected as being manipulated, controlling the communication terminal to notify the notification information to the user, without transmitting the notification information to the wearable terminal,
wherein, the notification information further includes information indicating a notification intensity,
biological information about the user is received from the wearable terminal, the biological information having been detected by the wearable terminal, and
when the notification information is transmitted to the wearable terminal, the larger a value indicating a degree of activity of the user there is, the value being included in the biological information that has been received, the higher the notification intensity is, indicated by information included in the notification information to be transmitted to the wearable terminal.

18. A wearable terminal, wherein
the wearable terminal is the wearable terminal included in the communication system according to claim 17; and
when the wearable terminal receives notification information, the wearable terminal notifies the user of the notification information.

19. A non-transitory recording medium in which a computer program is stored, the computer program causing a processor in a communication terminal to execute operations comprising:
detecting whether the communication terminal, which is connected via a network to a wearable terminal that is attached to part of a body of a user, is being manipulated;
if the communication terminal is detected as not being manipulated, transmitting notification information that includes push notification to the wearable terminal;
if the communication terminal is detected as being manipulated, controlling the communication terminal to notify the notification information to the user, without transmitting the notification information to the wearable terminal,
wherein, the notification information further includes information indicating a notification intensity,
biological information about the user is received from the wearable terminal, the biological information having been detected by the wearable terminal, and
when the notification information is transmitted to the wearable terminal, the larger a value indicating a degree of activity of the user there is, the value being included in the biological information that has been received, the higher the notification intensity is, indicated by information included in the notification information to be transmitted to the wearable terminal.

20. The method according to claim 1, wherein,
the notification intensity indicates intensity of vibration of the wearable terminal or volume of a speaker of the wearable terminal,
the notification information is transmitted to the wearable terminal to make the intensity of
vibration of the wearable terminal or the volume of speaker of the wearable terminal higher.

* * * * *